United States Patent [19]

Laignel et al.

[11] 4,084,608
[45] Apr. 18, 1978

[54] COCKS HAVING ROTATING VALVES AND SLIDING SEATS

[75] Inventors: Raymond A. Laignel, Ginestas; Patrick F. Mommeja, Arles, both of France

[73] Assignee: Constructions Metalliques de Provence, Levallois-Perret, France

[21] Appl. No.: 701,816

[22] Filed: Jul. 1, 1976

[51] Int. Cl.² ............................................. F16K 43/00
[52] U.S. Cl. ............................... 137/316; 137/246.22; 251/174
[58] Field of Search ...................... 137/246.22, 316; 251/159, 172, 174

[56] References Cited

U.S. PATENT DOCUMENTS

| 3,043,469 | 7/1962 | Leach | 251/172 X |
| 3,219,055 | 11/1965 | Dumm | 251/174 X |
| 3,472,270 | 10/1969 | Masheder | 251/172 X |
| 3,960,365 | 6/1976 | Horowitz | 251/174 X |

FOREIGN PATENT DOCUMENTS

| 1,049,007 | 8/1953 | France | 137/246.22 |

Primary Examiner—Harold W. Weakley
Attorney, Agent, or Firm—Lewis H. Eslinger

[57] ABSTRACT

The invention relates to cocks having a rotating valve and sliding seats. A cock according to the invention comprises a body equipped with fluid-passage ducts, a rotating valve, sliding seats in each duct and, to the rear of each seat, an annular space within which there slides an annular piston which is pushed towards the seat by a pressurized fluid, and which is locked mechanically in this position by screws.

3 Claims, 5 Drawing Figures

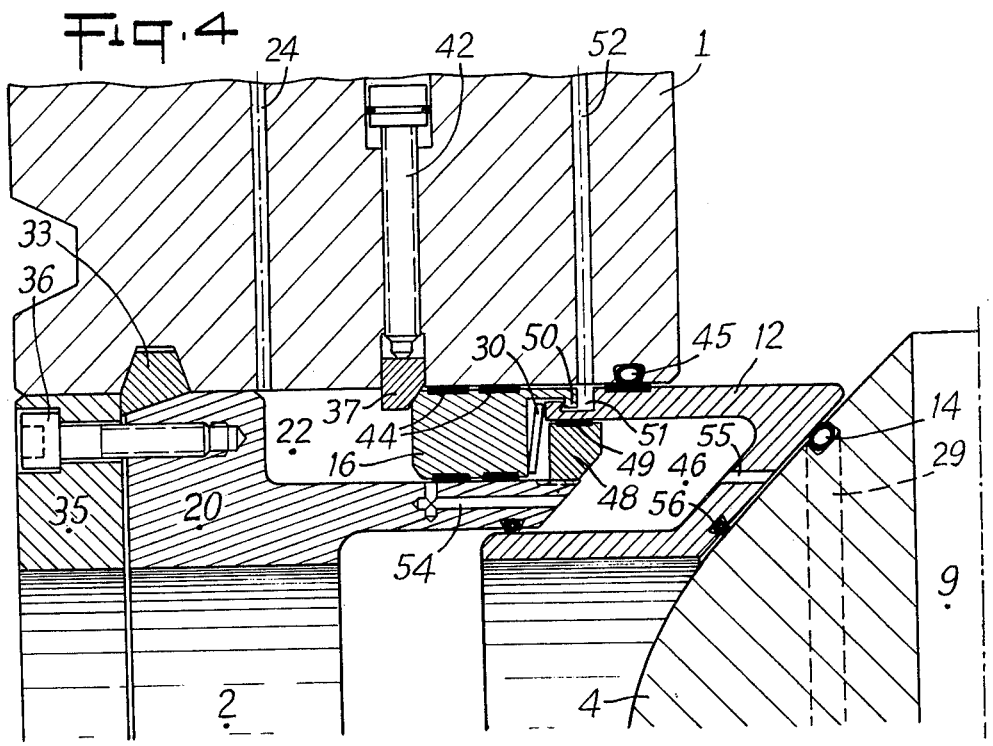
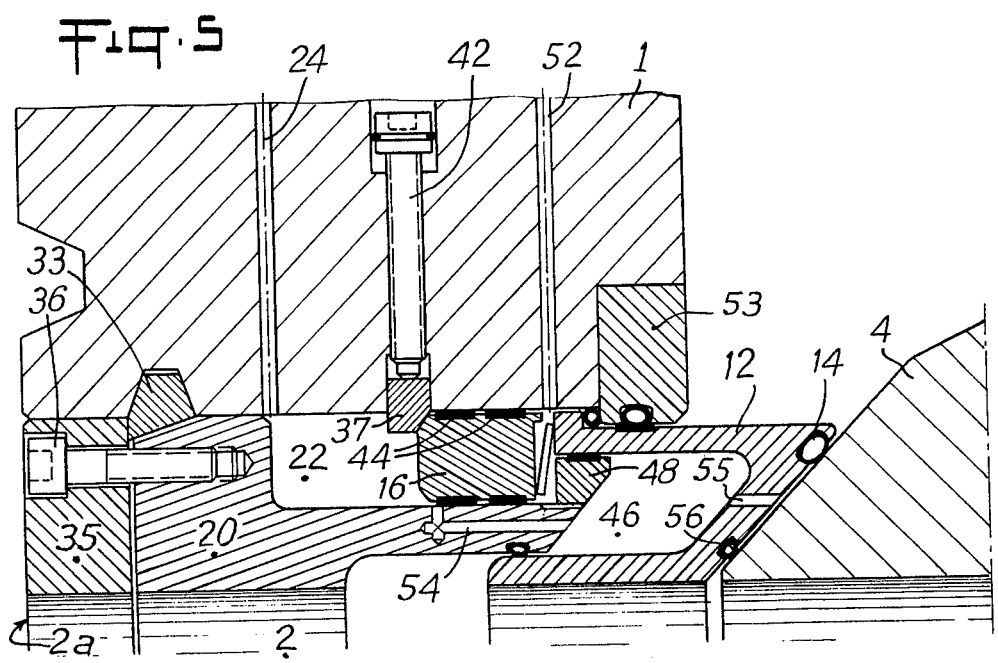

COCKS HAVING ROTATING VALVES AND SLIDING SEATS

The present invention relates to cocks having rotating valves and sliding seats.

A cock according to the invention is of the known type comprising:

a body defining a central chamber with cylindrical ducts for the passage of the fluid, each having an axis and two opposing ends: a first end opening to the outside of the body and a second end opening into the said chamber;

a valve rotating about an axis which is located within the said chamber, and through which a bore passes from one end to the other;

annular seats carrying seals co-operating with the said valve, each of the said seats being located near the second end of one of the said ducts, coaxially therewith, and adapted to slide axially within the said duct.

In known cocks of this type, the annular seats are held against the closure means, known as the valve, either by means of springs which are proloaded at the time of assembly, or by means of springs or spring washers which are compressed by means of screws screwed into the body.

These sliding-seat cocks have the advantage that the valve and the seats may be removed, either through the top of the body of the cock, or through the fluid-inlet and outlet orifices, and this simplifies maintenance. In either case, the ducts must be purged before any action is taken.

Where the seats are removable through the fluid-passage openings, the conduit must be partly or completely removed.

These operations are always costly and, in certain cases, dangerous.

In order to eliminate them, certain types of cocks are designed to be resealed, without purging the ducts or removing the conduits, by injecting a sealing product. As a rule, the improvement obtained disappears after the cock has been operated a few times, and this solution is merely an emergency repair.

Also known are cocks having seats which slide axially and are held against the valve by tappets arranged in axial or inclined bores, the said tappets being actuated by means of a threaded ring coaxial with each fluid-passage opening, and being accessible from the outside of the body. As a result of this the pressure upon the seal located between each seat and the valve is adjustable from outside the body, which usually makes it possible to reseal the joint so that it lasts, without purging the conduits or shutting down the unit. This is an important advantage.

One purpose of the invention is to provide means for adjusting the position of the sliding seat from the outside, the said means to be applicable both to a cock having a valve which is removable through the top of the cock, and to a cock having a valve which is removable through the fluid-passage openings.

The purpose of the invention is achieved by means of cocks which comprise, on the one hand, an annular piston associated with each seat but separate therefrom, the said piston being accommodated in an annular space coaxial with the said seat and located therebehind, on the side opposite the valve and, on the other hand, hydraulic ducts opening into each annular space behind each piston.

The cock according to the invention preferably comprises also hydraulic ducts opening into each annular space behind the said pistons, so that each piston pushes the seat with which it is associated into a position such that the said seat is held against the valve, with mechanical locks immobilizing the said annular pistons in this position.

According to one preferred example of embodiment, the body of the cock comprises, at the external periphery of each of the said annular conduits, a groove; a split ring accommodated in the said groove; threaded holes drilled through the said body and having two opposed ends: a first end opening at the external periphery of the body, and a second end opening into the said groove; and, in each of the said threaded holes, a screw which bears against the external surface of the said split ring when it is screwed into the said hole.

The holes are preferably located in a plane at right angles to the axis of the fluid-passage duct; the annular piston has a conical rear surface; and the split ring has a conical front surface which bears against the said conical rear surface when the screws are screwed into the said holes.

Each of the annular spaces co-axial with one of the fluid-passage ducts comprises an internal lateral wall and an external lateral wall parallel with the axis of the conduit, and two opposed axial ends, one front end, pointing towards the valve, which is open, and one rear end which is closed by a seat-carrying sleeve coaxial with the said duct which also constitutes the said internal lateral wall of the annular space and which has two axially opposed ends, one front end pointing towards the valve, and one rear end.

Located between the annular piston and the seat is a resilient device, preferably a conical washer located between two concave washers with the concave sides facing outwards. The seat-carrying sleeve is kept in place by means of a split segment located in a peripheral groove in the body of the cock, and by a stop ring arranged detachably upon the rear end of the said sleeve.

According to one characteristic of the invention, the seals between the seat and the valve, instead of being carried by the seat, are located in grooves machined, at the periphery of the valve, in planes parallel with the axis of the passage through the valve, and with the axis about which the valve pivots, thus eliminating precision-machining of the valve.

In one preferred example of embodiment, the seats are provided, on the side opposite the valve, with an annular recess with which the front end of the seat-carrying sleeve engages.

The length of this recess is preferably greater than the thickness of the sleeve, so that a threaded ring is screwed to the periphery of the end of the sleeve; each seat is hooked, to the annular piston with which it is associated, by a circular rib engaging in a groove of greater width, and the cock comprises passages for the supply of a compressed fluid to the space between each piston and each seat, for the purpose of moving the pistons and seats back simultaneously.

The result of the invention is a new product in the form of an improved valve cock.

The main advantage of this cock is that it makes it possible to adjust the compression of the seals, between the seat and the valve, from the outside, without having to purge or dismantle the conduits.

Since the movements of the sliding seat are controlled by an annular piston, it is easy to drill passages in the body of the cock in order to supply the piston with fluid, while the cock is in use, from an adapter easily accessible from the outside, without taking anything apart.

This compressed fluid may obviously be replaced by any other equivalent means for driving the piston, for example a thixotropic paste element, or an element in granular or powder form.

The said annular piston may also be pushed by means of a split ring having a conical side co-operating with radial screws, the heads of which are accessible from the outside of the body of the cock.

A solution of this kind permits only a small amount of axial movement. The preferred solution is one combining hydraulic or pneumatic thrust with mechanical locking by means of radial screws, since this eliminates the necessity of maintaining a permanent supply of compressed fluid to the cocks, thus reducing the likelihood of breakdown inherent in a purely hydraulic design.

The use of resilient means between the piston and the annular seat makes it possible to distribute the pressure uniformly over the entire periphery of the seal, regardless of any misalignment or deformation.

A cock according to the invention makes it possible to adjust at will the upstream and downstream seats separately or simultaneously, which, among other things, makes it possible to obtain cocks suitable for a vacuum. It is also possible to adjust the operating torque of the valve as a function of actual service conditions.

The means for adjusting the seats according to the invention make it possible to displace the seats in translation. A two-way cock according to the invention has three active elements: the valve and two sealing units, each consisting of a sliding seat, an annular piston, and a seat-carrying sleeve.

As soon as the seats have been retracted into the sleeve, it is easy to remove the valve from above. All worn parts, especially the seals, are then accessible and may easily be replaced without dismantling the conduits.

The following description relates to the drawings attached hereto and illustrating two examples of embodiment, not of a restrictive nature. In the said drawings:

FIGS. 2 and 5 are horizontal sections, to an enlarged scale, of the seat and seat-carrier, with the valve in the closed position;

FIGS. 3 and 4 are vertical sections, to an enlarged scale, of the seat and seat-carrier, with the valve in the open position.

Figure 1:
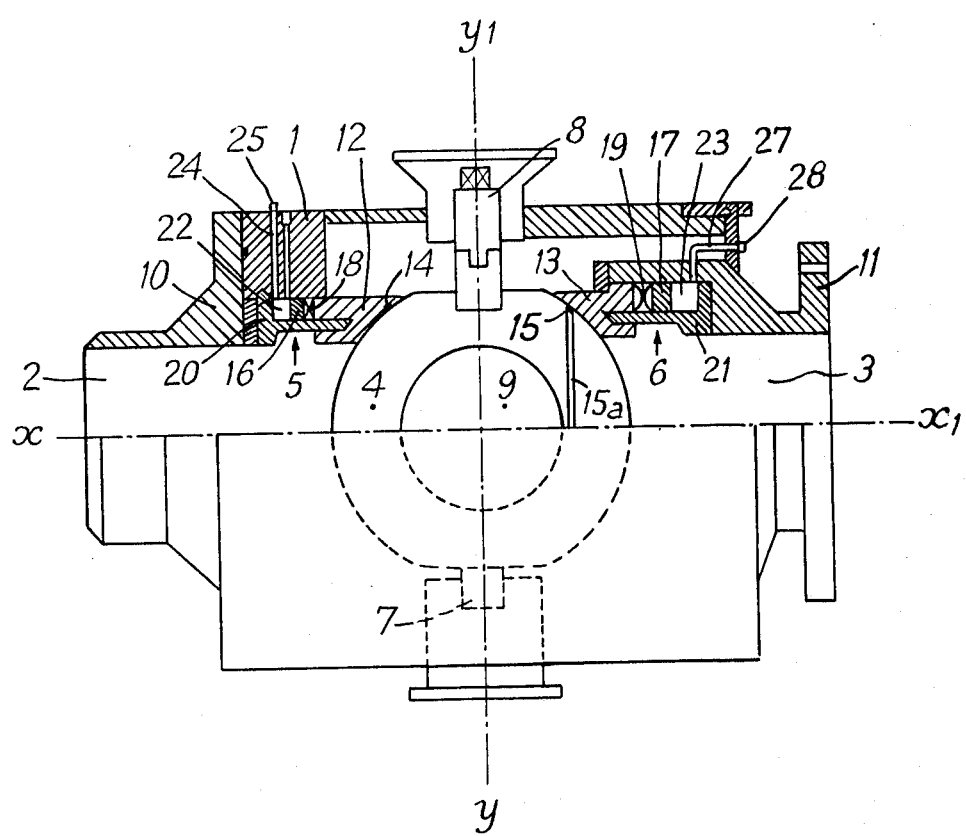
FIG. 1 is a half longitudinal section of the unit.

FIG. 1 illustrates, in longitudinal section, a two-way cock according to the invention, consisting of a body 1 defining two cylindrical ducts 2, 3 with an axis $x$ $xl$, through which a fluid circulates, a spherical valve 4 rotating about an axis $y$ $yl$, and two sealing devices 5, 6.

Valve 4 comprises, in known fashion, a pivot 7 and an operating key 8 having a polygonal adapter. Passing through the said valve is a cylindrical bore 9, of the same diameter as ducts 2, 3 and located in an extension thereof when the cock is open and, when the cock is closed in the position shown in the figure, at right angles to the previous position.

The left-hand portion of body 1 is fitted with an adapter 10 to be welded to a pipe, whereas the right hand portion thereof is equipped with a flange 11.

Sealing devices 5, 6 each consist of an annular seat, 12 and 13 respectively, which slide parallel with axis $x$ $xl$. This seat has a spherical or truncated-conical internal surface which mates with the surface of the valve or is tangential thereto. The said seat also compresses an annular seal, 14, 15 respectively, which provides a seal between the seat and the valve. The left-hand half of FIG. 1 shows a seal carried by seat 12, whereas the right-hand half shows a seal 15 located in a groove 15a machined in the periphery of the valve in a plane parallel with the axis of bore 9 and with axis of rotation $y$ $yl$.

Each device also comprises, to the rear of the seat, an annular piston, respectively 16, 17, with an axis $x$ $xl$.

One or more spring washers 18, 19 are fitted between the piston and the seat. Each device comprises a seat-carrying sleeve, 20 and 21 respectively, on axis $x$ $xl$, which, with body 1, defines an annular space, 22 and 23 respectively, on axis $x$ $xl$.

Annular piston 16 and seat 12 slide in the said annular space 23.

A passage 24 opens into annular space 22 and passes through the body of the cock. This passage has an adapter 25 enabling it to be connected to a source of compressed fluid which pushes piston 16 and seat 14 forward. Adapter 25 is easily accessible, even when the cock is in use.

Similarly, a passage 27 equipped with an adapter 28 opens into space 23, in order to move piston 17 and seat 13.

The cock is also provided with a mechanical locking means for the annular pistons, which will be described in conjunction with the following figures, in which it appears more clearly.

Figure 2:
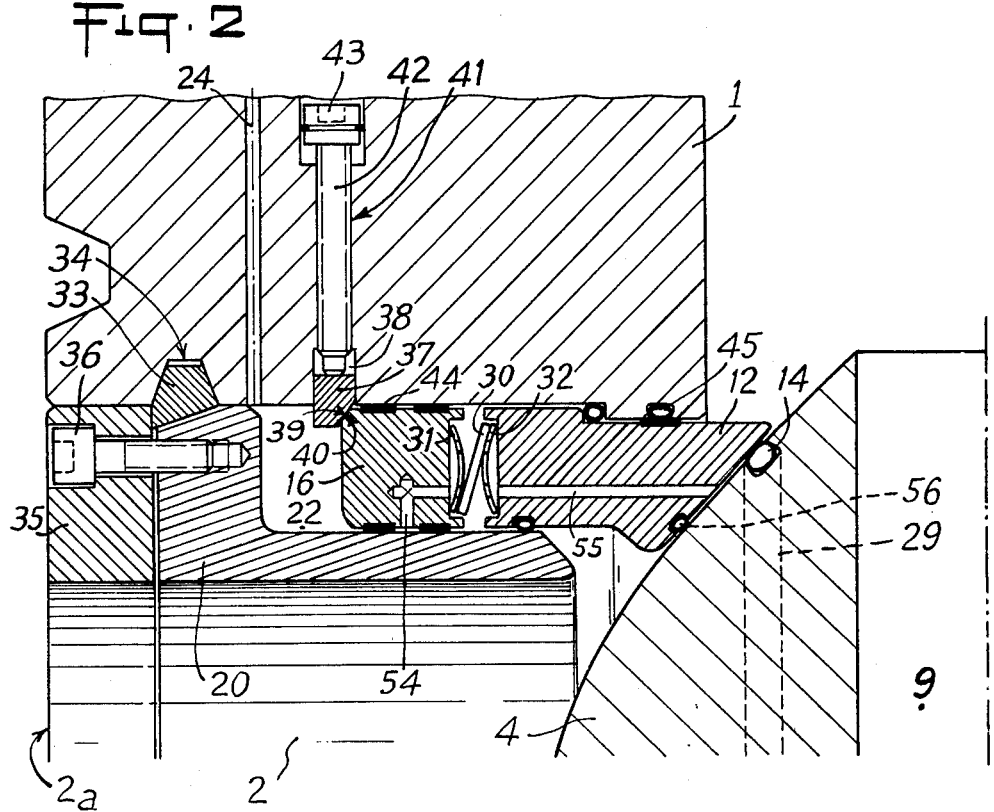

FIG. 2 illustrates an example of embodiment of a sealing device, to an enlarged scale and in horizontal half-section. In this figure, the valve is shown in the closed position, together with sliding seat 12, annular piston 16, seat-carrying sleeve 20, and annular space 22 defined by the internal surface of body 1, and by the external surface of sleeve 20, the internal surface of which defines duct 2.

In this example of embodiment, seal 14 between seat 12 and valve 4 is located is a groove 29 machined in the periphery of the valve, in a vertical plane parallal with the axis of bore 9. This arrangement eliminates the need for machining the valve with great precision. The only item requiring the precision machining is the surface of seat 12, and this facilitates production. Moreover, seal 14 is compressed only when the cock is in the closed position.

Interposed between seat 12 and piston 16 is a conical washer 30, of the Belleville type, between two concave washers 31, 32, the concave sides of which are turned outwardly. This arrangement makes it possible to combine the flexibility of the Belleville washer with the rigidity of the concave washers at the end of their travel.

Sleeve 20 may be removed through opening 2a, the said sleeve being kept in place by a split ring 33 located in a groove 34, and by a stop-ring 35 secured by screws 36 to the end of the sleeve.

Visible in FIG. 2 is passage 24 which supplies, to the end of cavity 22, a compressed fluid which pushes piston 16 which, in turn, pushes seat 12 through resilient element 30, 31, 32, and compresses seal 14 to a greater or lesser degree.

Also shown in FIG. 2 is a split ring 37 located in a groove 38.

This ring has a conical side 39 co-operating with the conical rear face 40 of the piston. Groove 38 communicates with threaded holes 41 which are drilled radially through body 1, and which open out at the external periphery thereof. Screwed into these holes are screws 42, heads 43 of which are accessible from the outside of the body, thus making it possible to deform ring 37 radially, and thus to lock piston 16 in the position to which it has been moved by the thrust of the fluid, after which the flow of compressed fluid is shut off. Piston 16 obviously has sealing joints or segments 44.

A toroidal seal 45 located in a groove provides a seal between the seat and the body.

Figure 3:
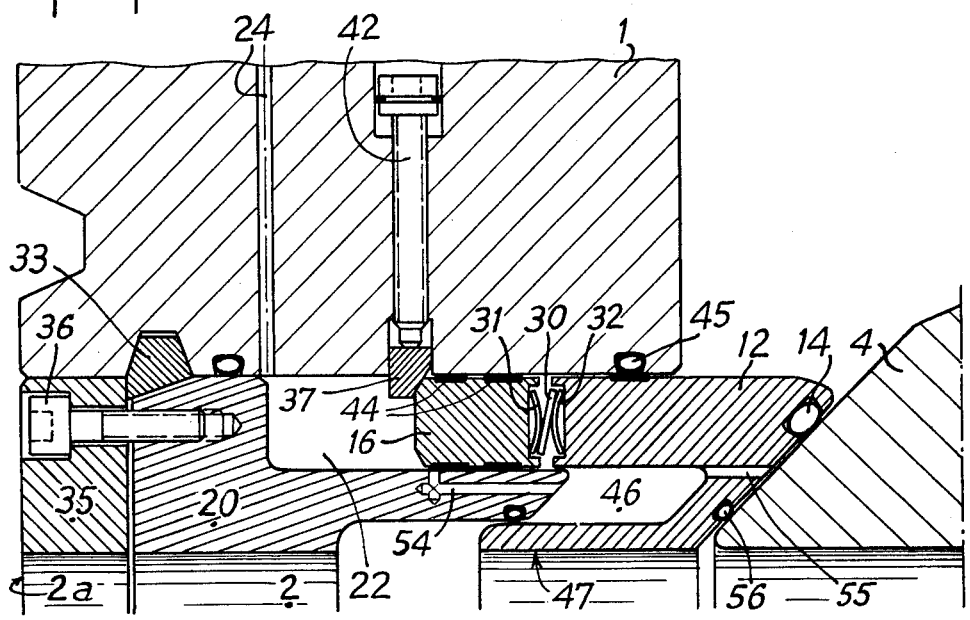

FIG. 3 illustrates, in vertical half-section, another design of sealing device, parts similar to those in FIG. 2 bearing the same reference numerals.

This design is one in which valve 4 may be removed through the top of the cock.

Seal 14 is accommodated in a groove in seat 12 located in a plane at right angles to $x$ $x^l$. On the side opposite the valve, seat 12 has a very deep recess 46 in which the front end of sleeve 20 engages, seat 12 being thus guided by the said sleeve. As a result of this recess, internal surface 47 of the seat defines duct 2, thus reducing the loss in pressure.

FIG. 4 illustrates, in horizontal half-section, another design, similar parts being again identified by the same reference numerals.

As in the example in FIG. 3, seat 12 has a U-shaped cross section defining a recess 46, but the height of this recess is greater than the thickness of the front end of sleeve 20, so that a threaded ring 48 may be screwed to the end of body 20, the said ring carrying a peripheral seal 49 providing a seal between the said ring and the seat.

Piston 16 and seat 12 are hooked together by means of a rib 50, integral with the one, and engaging in a groove 51 which is cut into the periphery of the other and which is wider than the said rib 50, so that piston 16 carries the seat along with it as it moves back. A second passage 52 is drilled through body 1 and opens into the space between, on the one hand, the front end of piston 15 and, on the other hand, the rear end of seat 12 and the ring 48. This ring makes it possible to supply a compressed fluid which causes the piston to move back simultaneously with seat 12. This frees the valve which may then be removed through the top of the cock.

In this example, the resilient device is in the form of a single conical washer 30.

FIG. 5 illustrates, in vertical half-section and still using the same reference numbers, another example of embodiment similar to the previous example, but in which sliding seat 12 comes to rest against a stop 53 secured detachably to body 1. After the valve has been removed through the top of the cock, stop ring 53 may be removed, and the sealing device may also be removed from above.

In all of the four variants described above, after stop ring 35 and segment 33 have been removed, seat-carrying sleeve 20 may be removed through opening 2a.

Visible in FIGS. 2 to 5 are the passages 54, 55 which allow annular chamber 22 to communicate with the face of seat 12 bearing upon rotating valve 4 when annular piston 16 is at the end of its forward travel. These passages make it possible to inject under pressure, between the valve and the seat, a viscous or paste-like product to restore the seal. Passage 55 opens out between main seal 14 and a secondary seal 56.

Passage 54 opens into chamber 22 through an orifice which is exposed when piston 16 reaches the end of its locking travel, so that passage 24 may be used to feed consecutively, into chamber 22, a compressed fluid and then a sealing product.

It is to be understood that, without departing from the scope of the invention, various parts of the cocks described above may be replaced by equivalent parts performing the same functions.

We claim:

1. A cock having a rotating valve and consisting of:
   a body defining a central chamber with cylindrical ducts for the passage of fluid, each duct having an axis and two opposing ends including a first end opening to the outside of the body and a second end opening into said chamber;
   a valve rotating about an axis which is located within said chamber, and through which a bore passes from one end to the other;
   annular seats carrying seals co-operating with said valve, each of the said seats being located near the second end of one of said ducts, coaxially therewith, and adapted to slide axially within said duct;
   an annular piston associated with each seat, but separate therefrom, said piston being accommodated in an annular space coaxial with said seat and located therebehind, on the opposite side of the valve;
   hydraulic means for displacing said pistons axially, including hydraulic means for pushing each of said annular pistons towards the seat with which it is associated, into a position such that the seat is applied to the valve; and mechanical means for locking said annular piston in this position; said body of the cock having a groove formed therein at the periphery of each of said fluid passage ducts; a split ring located in said groove; threaded holes drilled through said body and having two opposed ends including a first end opening at the external periphery of the body and a second end opening into said groove; and a screw in each of said threaded holes bearing against the external surface of said split ring when it is screwed into said hole.

2. A cock according to claim 1, in which the said holes are located in a plane at right angles to the axis of the said fluid-passage duct, and in which the said annular piston comprises a conical rear face, the said split ring comprising a conical front face which bears against the said conical rear face when the screwes are screwed into the holes.

3. A cock according to claim 1, in which the said body also comprises, at the periphery of each of the said ducts, at least one compressed-fluid-supply passage having two opposed ends: a first end which opens at the outside of the body, and a second end which opens into the said annular space, at the rear end, opposite the cock, the said compressed fluid serving to move the piston forwards when the cock is being assembled, in order to bring the piston and the seat into a position in which the seat bears against the valve and the said screws serve to lock the said piston in this position.

* * * * *

UNITED STATES PATENT AND TRADEMARK OFFICE
CERTIFICATE OF CORRECTION

PATENT NO. : 4,084,608
DATED : April 18, 1978
INVENTOR(S) : Raymond A. Laignel et al.

It is certified that error appears in the above–identified patent and that said Letters Patent are hereby corrected as shown below:

In The Heading:

[73] change the Assignee to --Constructions Metalliques de Provence, Levallois-Perret, France--, a part interest --

Signed and Sealed this

Twenty-fourth Day of April 1979

[SEAL]

Attest:

RUTH C. MASON
Attesting Officer

DONALD W. BANNER
Commissioner of Patents and Trademarks